United States Patent
Dho

(10) Patent No.: US 7,014,318 B2
(45) Date of Patent: Mar. 21, 2006

(54) LIGHT COUPLING DEVICE AND IMAGE PROJECTION APPARATUS USING THE SAME

(75) Inventor: Sang-whoe Dho, Suwon (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 148 days.

(21) Appl. No.: 10/408,659

(22) Filed: Apr. 8, 2003

(65) Prior Publication Data

US 2003/0223046 A1    Dec. 4, 2003

(30) Foreign Application Priority Data

Apr. 9, 2002    (KR)    ................................ 2002-19300

(51) Int. Cl.
*G03B 21/00*    (2006.01)

(52) U.S. Cl. .............................. 353/31; 353/82; 353/94

(58) Field of Classification Search .................. 353/30, 353/31, 34, 37, 38, 82, 94; 385/115, 116, 385/119

See application file for complete search history.

(56) References Cited

U.S. PATENT DOCUMENTS

| | | | | |
|---|---|---|---|---|
| 3,323,886 A | * | 6/1967 | Hays | 65/410 |
| 4,810,052 A | * | 3/1989 | Fling | 385/44 |
| 5,661,837 A | * | 8/1997 | Yamamoto et al. | 385/115 |
| 5,765,934 A | * | 6/1998 | Okamori et al. | 353/94 |
| 5,931,983 A | * | 8/1999 | Bloom | 65/378 |
| 6,513,937 B1 | * | 2/2003 | Dehmlow | 353/94 |

* cited by examiner

*Primary Examiner*—W. B. Perkey
(74) *Attorney, Agent, or Firm*—Sughrue Mion, PLLC

(57) ABSTRACT

A light coupling device and an image projection apparatus using the same, wherein photoconductive media of the light coupling device include optical fibers that transmit light. Each light coupling device has at least two input terminals, at least two output terminals, and a connector connecting the input and output terminals, wherein the connector forms at least one light path. The light coupling device receives and divides respective R, G, and B monochromatic light beams. By connecting a light source with multiple optical instruments via the light coupling devices, images can be projected on multiple screens. Further, by using optical fibers to transmit light beams, the size of image instruments is minimized and light loss is reduced.

7 Claims, 5 Drawing Sheets

LIGHT COUPLING DEVICE AND IMAGE PROJECTION APPARATUS USING THE SAME

CROSS-REFERENCE TO RELATED APPLICATIONS

This application claims priority to Korean Patent Application No. 2002-19300, filed Apr. 9, 2002, which is incorporated herein by reference in its entirety.

BACKGROUND OF THE INVENTION

1. Field of the Invention

The present invention relates to a light coupling device and an image projection apparatus using the same and, more particularly, to a light coupling device and an image projection apparatus using the same, which employ optical fibers to project red, green, and blue (R, G, and B) laser beams onto multiple screens, respectively.

2. Description of the Related Art

A projector is an image projection apparatus showing images by projecting inputted image signals onto screens. Such an image projection apparatus is mainly employed to give presentations in conference rooms or to implement projectors in theaters and home theater systems.

Prior art methods for implementing a large screen magnify images through lenses and project images onto screens, wherein the images appear on liquid crystal displays (LCDs) or on cathode ray tubes (CRTs). However, while such methods magnify images, they do not provide clear image quality. In order to solve this problem, an image projection apparatus using digital micromirror device (DMD) panels is presently employed.

The DMD is a semiconductor optical switch using micromirrors. The micromirrors control light reflections based on an inputted image signal. The DMD is of digital fashion so that it has a good color reproductivity and a high contrast ratio with respect to image signals. Further, the DMD does not require A/D and D/A conversions so that it implements clear images.

FIG. 1 shows an exemplary embodiment of a conventional image projection apparatus implementing images on multiple screens.

Referring to FIG. 1, a conventional image projection apparatus 100 has a light source 110, a first high-reflection mirror 115, first and second dichroic mirrors 120 and 130, a second high-reflection mirror 140, first, second, and third condenser lenses 122, 132, and 142, first, second, and third optical fibers 124, 134, and 144, and first, second, and third light scan parts 150, 160, and 170.

FIG. 1 shows solid lines indicating paths for red light beams, which are equally divided into three light beams by the first optical fiber 124 so as to travel to the respective light scan parts 150, 160, and 170. FIG. 1 further shows one-dot chain lines indicating paths for green light beams, which are equally divided into three light beams by the second optical fiber 134 so as to travel to the respective light scan parts 150, 160, and 170, and two-dot chain lines indicating paths for blue light beams, which are equally divided into three light beams by the third optical fiber 144 so as to travel to the respective light scan parts 150, 160, and 170.

The light source 110 emits white light, such as a laser beam. The first high-reflection mirror 115 reflects the light emitted from the light source 110 to change its path. The first and second dichroic mirrors 120 and 130 selectively reflect or transmit the light reflected and incident from the first high-refection mirror 115.

The first dichroic mirror 120 reflects red light beams of the incident light and transmits green and blue light beams. The second dichroic mirror 130 reflects green light beams and transmits blue light beams, which both pass through the first dichroic mirror 120. Finally, the second high-reflection mirror 140 reflects blue light beams.

The first, second, and third condenser lenses 122, 132, and 142 collect red, green, and blue light beams, respectively. Red light beams reflected from the first dichroic mirror 120 are collected into the first optical fiber 124 by the first condenser lens 122. Likewise, green light beams reflected from the second dichroic mirror 130 are collected into the second optical fiber 134 by the second condenser lens 132; and blue light beams reflected from the second high-reflection mirror 140 are collected into the third optical fiber 144 by the third condenser lens 142.

The output terminals of the first, second, and third optical fibers 124, 134, and 144 are each divided into three regions, respectively. Red light beams incident into the first optical fiber 124 is divided into three equal light beams at the output terminals, which are divided into three regions 124a, 124b, and 124c. The three equal red light beams are respectively incident onto the first, second, and third light scan parts 150, 160, and 170.

Green light beams incident into the second optical fiber 134 is divided into three equal light beams at the output terminals, which are divided into three regions 134a, 134b, and 134c. The three equal green light beams are respectively incident onto the first, second, and third light scan parts 150, 160, and 170. Blue light beams incident into the third optical fiber 144 is divided into three equal blue light beams at the output terminals, which are divided into three regions 144a, 144b, and 144c. The three equal light beams are respectively incident onto the first, second, and third light scan parts 150, 160, and 170.

The light scan parts 150, 160, and 170 are optical instruments, such as liquid crystal projectors. The first light scan part 150 uses red, green, and blue light beams, which are respectively incident after being divided into three equal light beams at the first, second, and third optical fibers 124, 134, and 144 to implement or project an image on a screen, i.e., screen_1. The second and third light scan parts 160 and 170 also use red, green, and blue light beams, respectively, to implement or project images on screens, i.e., screen_2 and screen_3.

However, the conventional image projection apparatus as discussed above is so constructed that the output amounts of the light beams outputted from the optical fibers are always the same. This means that the total output amount of the light beams for an image projected on the screens is the same. Therefore, when an image is simultaneously implemented or projected on multiple screens having different sizes, the image implemented or projected on a screen of large size becomes dark and has a severe degree of image flickering compared to images displayed on the other screens. Further, there exists a problem in that an image size should be reduced in order to solve the darkness and flickering problems.

SUMMARY OF THE INVENTION

It is one aspect of the present invention to provide a light coupling device and an image projection apparatus using the same, which are capable of controlling output ratios of light beams outputted from optical fibers so as to uniformly maintain the brightness of images displayed on multiple screens.

In order to achieve the above and other aspects, a light coupling device according to the present invention comprises a photoconductive medium having at least two input terminals; at least two output terminals; and a connector connecting the input and output terminals; and having first lenses provided at the input terminals of the photoconductive medium for condensing inputted light beams, wherein the connector forms at least one light path.

In more detail, the connector is formed by heating a position located at a certain distance from the input terminals. Further, the connector is heated with a predetermined light coupling ratio, wherein the light coupling ratio depends on the extent of proximity of the input terminals at the end surface of the connector and on a length of the connector in a lengthwise direction.

The photoconductive medium includes optical fibers. The connector is arranged at either a first position at which cores of at least two optical fibers come close within a predetermined distance in lengthwise directions of the cores, or at a second position at which the cores of the optical fibers are in contact in the lengthwise directions of the cores. In addition, a second lens is provided at the output terminals of the photoconductive medium for condensing and outputting the inputted light beams that were transmitted through the connector.

An image projection apparatus according to the present invention comprises a light source for emitting plural monochromatic light beams having different wavelengths; a plurality of light coupling devices, each having at least two input terminals and at least two output terminals for receiving and dividing the monochromatic light beams in a predetermined output ratio; and multiple light scan parts, each receiving the respective divided monochromatic light beams and each scanning or projecting the light beams on screens.

In more detail, the light coupling devices each include a photoconductive medium having at least two input terminals, at least two or more output terminals, and a connector for connecting the input and output terminals; and having first lenses provided at the input terminals of the photoconductive medium for condensing inputted monochromatic light beams, wherein the connector forms at least one light path.

The connector is formed by heating a position located at a certain distance from the input terminals. Further, the connector is heated with a predetermined light coupling ratio, wherein the light coupling ratio depends on the extent of proximity of the input terminals at the end surface of the connector and on a length of the connector in a lengthwise direction.

The photoconductive medium includes optical fibers. The connector is arranged at either a first position at which cores of at least two optical fibers come close within a predetermined distance in lengthwise directions of the cores, or at a second position at which the cores of the optical fibers are in contact in the lengthwise directions of the cores. In addition, a second lens is provided at the output terminals of the photoconductive medium for condensing and outputting the inputted light beams that were transmitted through the connector.

Compared to prior art systems, the present invention exhibits a lower light loss for bi-directional light coupling devices and enables implementing or projecting images of improved brightness on multiple screens.

BRIEF DESCRIPTION OF THE DRAWINGS

The above and other aspects as well as other features of the present invention will become more apparent by describing in detail exemplary embodiments thereof with reference to the attached drawings, in which.

DETAILED DESCRIPTION OF EXEMPLARY EMBODIMENTS

Hereinafter, exemplary embodiments of the present invention are described with reference to the accompanying drawings.

Figure 1:
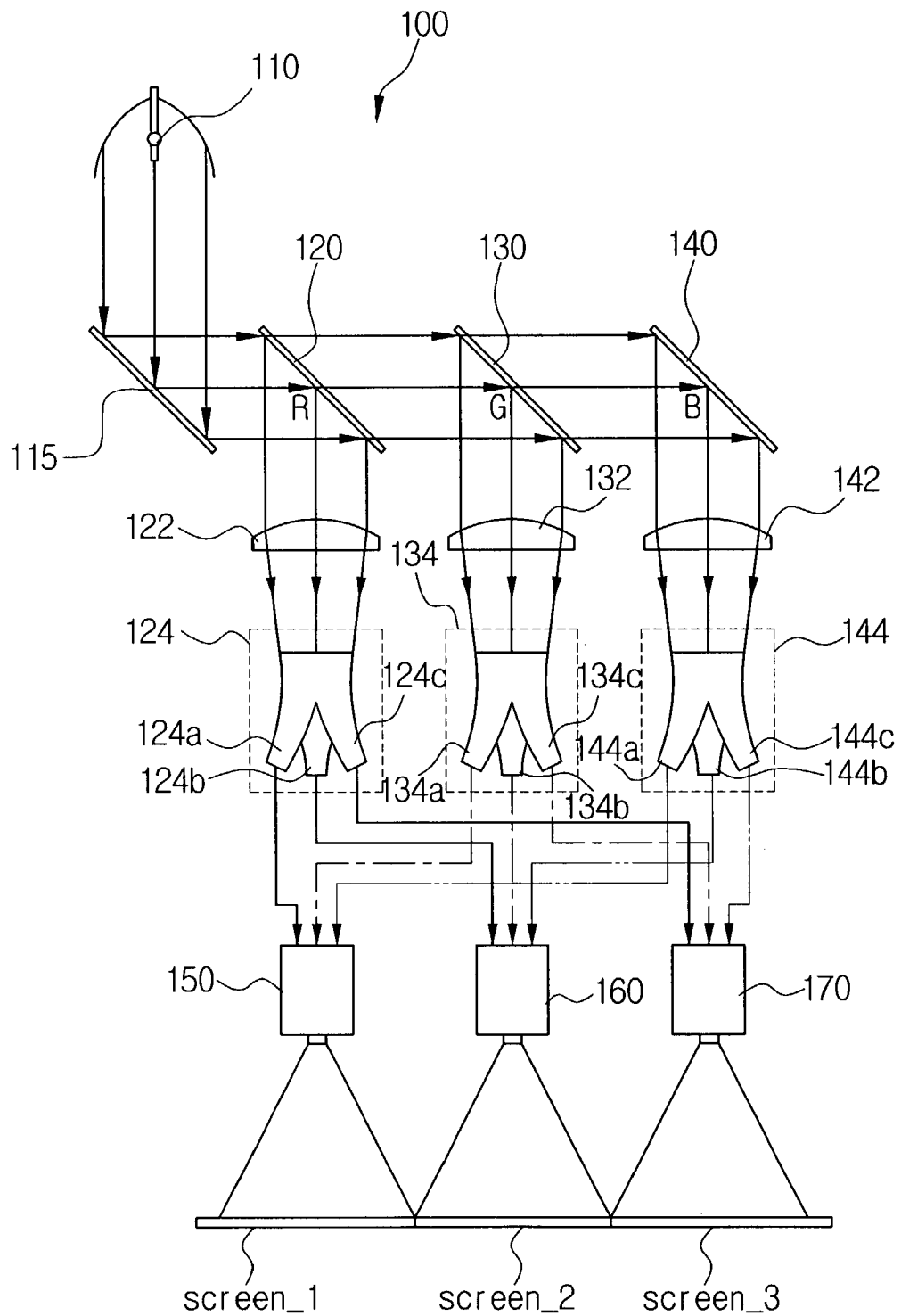
FIG. 1 shows an embodiment of a conventional image projection apparatus implementing images on multiple screens.
Figure 2:
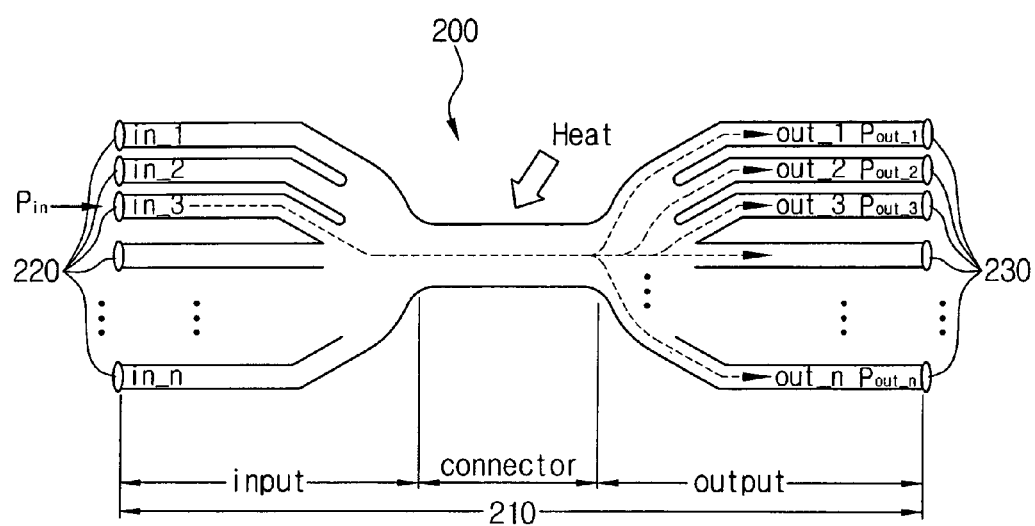
FIG. 2 shows a basic configuration of a light coupling device having an (n×n) structure according to an exemplary embodiment of the present invention.

FIG. 2 shows a basic configuration of a light coupling device or a directional coupler (DC) having an (n×n) structure according to an exemplary embodiment of the present invention, with n being a positive integer.

Referring to FIG. 2, an (n×n) directional coupler 200 according to an exemplary embodiment of the present invention has a photoconductive medium 210, first lenses 220, and second lenses 230. The photoconductive medium 210 is composed of optical fibers and transmits light beams, such as laser beams. Light paths in FIG. 2 are indicated by dotted lines.

The photoconductive medium 210 has multiple input terminals in_1, in_2, in_3, . . . , in_n, that is, n input terminals; and multiple output terminals out_1, out_2, out_3, . . . , out_n, that is, n output terminals. The number of the input terminals is the same as the number of the output terminals, and the photoconductive medium 210 has an (n×n) structure if it has the n input terminals and n output terminals. In such a case, the minimum number of optical fibers necessary for the directional coupler 200 is n.

The first lenses 220 are condensing lenses provided at the input terminals of the photoconductive medium 210. The second lenses 230 are condensing lenses provided at the output terminals of the photoconductive medium 210. Therein, a condensing lens is a lens that condenses light beams to a desired direction. Preferably, but not necessarily, a collimating lens, a condenser lens, or the like is employed.

A connector connecting the multiple input terminals and output terminals forms at least one light path. The at least one light path is formed by connecting points in a certain distance from the input terminals, namely, predetermined positions of multiple optical fibers. The interconnection of the optical fibers is accomplished by heating or polishing.

The connector divides and outputs light to the output terminals. Output ratios of light beams outputted from the respective output terminals are determined by an extent of proximity, that is, by a coupling ratio of respective optical fibers connected at the connector. In other words, input light is divided and outputted in a coupling ratio between cores of the optical fibers at the connector. This is based on the principle of the evanescent wave.

The coupling ratio is determined in a process of heating and coupling respective optical fibers. Thereby, an output ratio of light is determined. The coupling ratio varies depending on the extent of proximity of the cores and on the lengths of the respective optical fibers to be coupled with respect to lengthwise directions of the respective optical fibers.

In other words, the output ratio of light at the output terminals varies depending on the extent of heating necessary for the respective cores to be placed in a predetermined interval, for example, an interval of a few micrometers, and depending on the length of the connector maintaining the predetermined interval with reference to the lengthwise directions of the cores.

The connector, which is formed with a predetermined coupling ratio, has a structure that is arranged either at a first position at which the cores of at least two optical fibers come close within a predetermined interval with respect to the lengthwise directions of the cores, or at a second position at which the cores of at least two optical fibers are in contact with respect to the lengthwise directions of the cores.

Monochromatic light (Pin: a total inputted amount of light) condensed at the first lenses 220 is inputted into an arbitrary input terminal, e.g., in_3, of the plural input terminals in_1, in_2, in_3, . . . , and in_n. The monochromatic light Pin condensed at the arbitrary input terminal in_3 is transmitted to the multiple output terminals out_1, out_2, out_3, . . . , and out_n through the connector.

Light output amounts Pout_1, Pout_2, Pout_3, . . . , and Pout_n outputted from the multiple output terminals out_1, out_2, out_3, . . . , and out_n are proportional to a coupling ratio of the connector, wherein Pout_n denotes a light amount outputted through the output terminal out_n and wherein n is a positive number. Therein, Pin≈(Pout_1+Pout_2+Pout_3+. . . +Pout_n). This is because there are no or only little light losses for light transmitted through the cores of the optical fibers when the light is transmitted by the optical fibers.

It is noted that such a directional coupler 200 can be used in bi-directional fashion. This means that the output terminals can be used as the input terminals and vice versa.

Figure 3A:
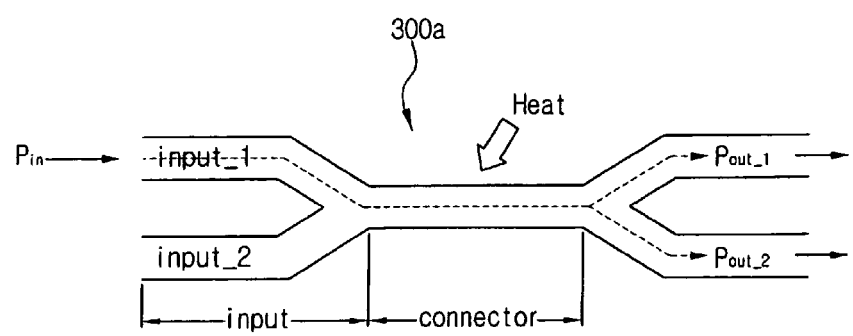
FIG. 3a shows a light coupling device having a (2×2) structure according to an exemplary embodiment of the present invention.
Figure 3B:
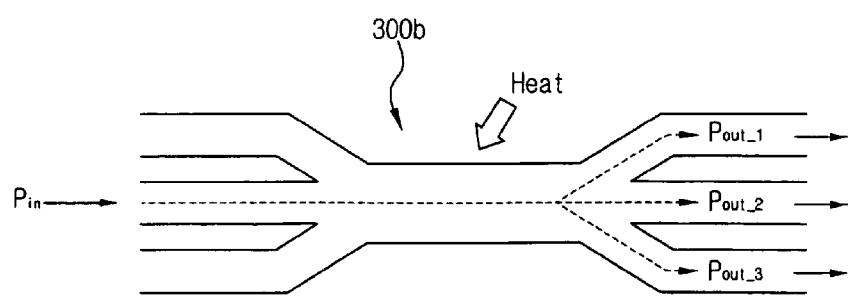
FIG. 3b shows a light coupling device having a (3×3) structure according to an exemplary embodiment of the present invention.

FIG. 3a shows a directional coupler of a (2×2) structure according to an exemplary embodiment of the present invention, and FIG. 3b shows a directional coupler of a (3×3) structure according to an exemplary embodiment of the present invention.

A (2×2) directional coupler (DC) 300a formed with two optical fibers has a structure as shown in FIG. 3a, and a (3×3) DC 300b formed with three optical fibers has a structure as shown in FIG. 3b. Therein, condensing lenses, which are provided at the input and output terminals of FIG. 3a and FIG. 3b, are not shown.

Referring to FIG. 3a, it is assumed that a light amount of a monochromatic light condensed at a predetermined input terminal input_1 of the directional coupler 300a is 100, and that a coupling ratio (coupled portion for input_1: coupled portion for input_2) of the two optical fibers coupled at the connector is 4:6. An output ratio (Pout_1:Pout_2) of light inputted from the connector to the output terminals and then outputted to the outside becomes about 40:60, that is, 4:6, so that it is almost the same as the coupling ratio. As a result, Pin=(Pout_1+Pout_2)=100. Likewise, in FIG. 3b, Pin=(Pout_1+Pout_2+Pout_3).

Such a directional coupler 200 having an (n×n) structure can be applied when the same images are implemented or projected on n screens. That is, by installing the directional coupler 200, which has n optical fibers, in an image apparatus, such as a projector, it is possible to implement or project images on multiple screens.

Further, the input and output terminals of the directional coupler 200 have condensing lenses so as to form a connector structure. Therein, the directional coupler 200 can be replaced. For example, if images of different sizes are implemented or projected on multiple screens, replacement of the directional coupler 200 enables more simplified implementations or projections.

Figure 4:
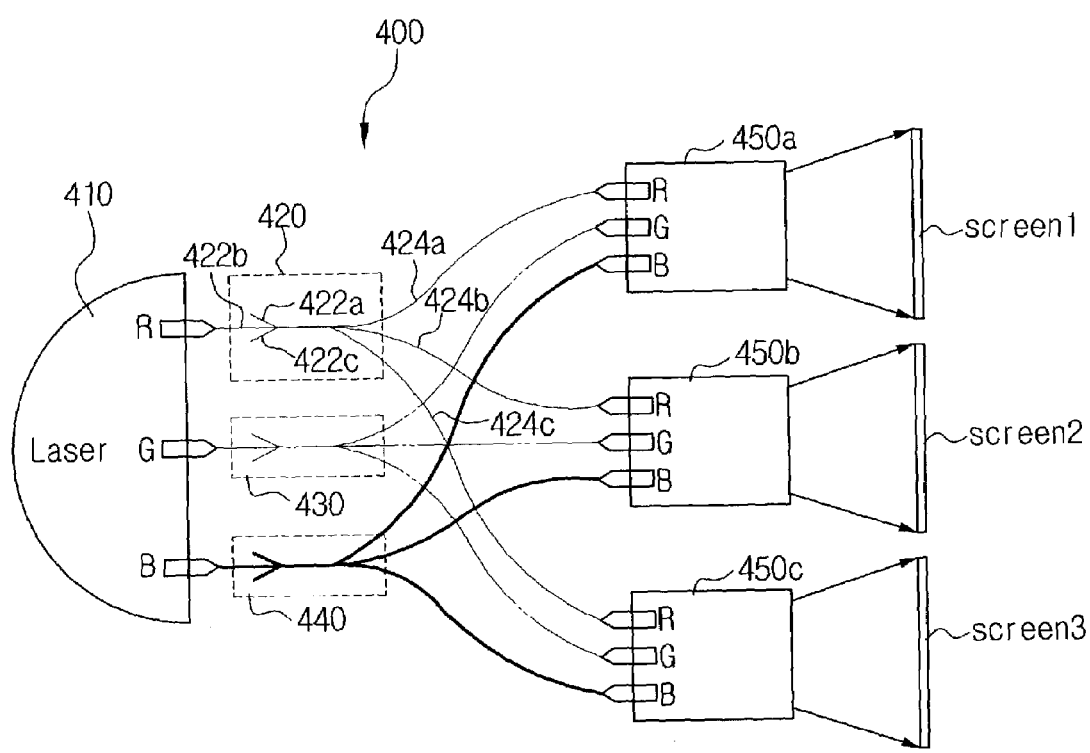
FIG. 4 shows an image projection apparatus using light coupling devices according to an exemplary embodiment of the present invention.

FIG. 4 shows an image projection apparatus using directional couplers (interchangeably referred to as light couplers or light coupling devices) according to an exemplary embodiment of the present invention.

Referring to FIG. 4, an image projection apparatus 400 according to the present invention has a light source 410; an R-light coupler 420; a G-light coupler 430; a B-light coupler 440; and first, second, and third light scan parts 450a, 450b, and 450c. The exemplary embodiment of FIG. 4 shows three (3×3)-structured light couplers 420, 430, and 440, which transmit R, G, and B laser beams into three light scan parts 450a, 450b, and 450c, respectively.

The light source 410 emits multiple monochromatic light beams having different wavelengths, and can include a laser, an Arc lamp, a metal halide lamp, a halogen lamp, or a Xenon lamp. The present invention employs R, G, and B laser beams as the multiple monochromatic light beams (hereinafter referred to as 'laser beams').

Each of the R, G, and B light couplers 420, 430, and 440 is composed of at least three optical fibers. The minimum number of optical fibers necessary for the light couplers 420, 430, and 440 is the same as the number of the light scan parts 450a, 450b, and 450c.

The three light couplers 420, 430, and 440 are provided in case that the respective R, G, and B laser beams are emitted from the light source 410. The light couplers 420, 430, and 440 receive and distribute at a predetermined ratio the R, G, and B laser beams emitted from the light source 410, and output the distributed R, G, and B laser beams to the light scan parts 450a, 450b, and 450c.

A detailed description of the R, G, and B light couplers 420, 430, and 440 will be omitted, since each of them has the same structure and function as the directional coupler 200 described with reference to FIG. 2. In FIG. 4, the R-laser beam transmitted by the R-light coupler 420 is indicated by solid lines; the G-laser beam transmitted by the G-light coupler 430 is indicated by two-dot chain lines; and the B-laser beam transmitted by the B-light coupler 440 is indicated by bold solid lines.

Each of the light couplers 420, 430, and 440 is divided into input terminals, a connector, and output terminals. Condensing lenses for condensing the respective R, G, and B laser beams emitted from the light source 410 are provided at the input and output terminals of the light couplers 420, 430, and 440.

When the light couplers 420, 430, and 440 are installed in an optical apparatus, such as a projector, it is preferable that no condensing lens is used at the output terminals of the light couplers 420, 430, and 440. This is because the light scan parts 450a, 450b, and 450c can not effectively use light beams outputted from the output terminals if condensing lenses are provided at the output terminals.

Hereinafter, a description of image projections is given in connection with an embodiment of the R-light coupler 420, which transmits the R-laser beam.

An R-laser beam emitted from the light source 410 is incident onto an arbitrary input terminal, e.g., input terminal 422b, of input terminals of the R-light coupler 420. A total light amount of the R-laser beam incident onto the arbitrary input terminal 422b is indicated as Pin. The connector is formed by a heating process so as to connect three optical fibers into one unit at a position that is located at a certain distance from the input terminals 422a, 422b, and 422c. Such a connector has a predetermined coupling ratio.

The coupling ratio is determined by the extent of the proximity of the cores of the respective optical fibers at the connector and by the length of the connector in the lengthwise direction. The coupling ratio becomes a reference for dividing the R-laser beam transmitted through the connector.

The output amounts of the light beams, which are divided and outputted from the connector to the output terminals, are proportional to the coupling ratio. In other words, the light output amounts Pout_1, Pout_2, and Pout_3 of the output terminals can be controlled based on the coupling of the three optical fiber cores or based on the extent of proximity of the three optical fiber cores at the connector.

Further, in a process forming the connector, the coupling ratio of the connector can be controlled by taking the light output amounts Pout_1, Pout_2, and Pout_3 into account.

The reference numeral Pout_1 denotes a light output amount outputted from the multiple output terminals 424a, 424b, and 424c to the first light scan part 450a. Further, the reference numeral Pout_2 denotes a light output amount outputted to the second light scan part 450b; and the reference numeral Pout_3 denotes a light output amount outputted from the third light scan part 450c. Therein, an input light of the R-laser beam Pin approximately equals the output light of the R-laser beam Pout_1+Pout_2+Pout_3. This results from no or little light loss during the transmission of light through the cores of the optical fibers.

The same structure and operations of such a light coupler 420 are applied to the light couplers 430 and 440, which are associated with the G-laser beams and the B-laser beams, respectively. The coupling ratios of the light couplers 420, 430, and 440, which transmit the respective R, G, and B laser beams, are the same, so that the ratios of the total light amounts inputted to the respective light scan parts 450a, 450b, and 450c are the same.

The light couplers 420, 430, and 440 can be used in a bi-directional fashion. This means that the input terminals of the light couplers 420, 430, and 440 can be used as output terminals and vice versa. Further, the input and output terminals of the light couplers 420, 430, and 440 are devices for coupling the light source 410 and the light scan parts 450a, 450b, and 450c, so that they can be replaced.

If images of different sizes are projected on multiple screens, the images can be easily implemented or projected by replacing the light couplers 420, 430, and 440. That is, only the size of an image is changed, while the brightness of the initial image is maintained.

Figure 5:
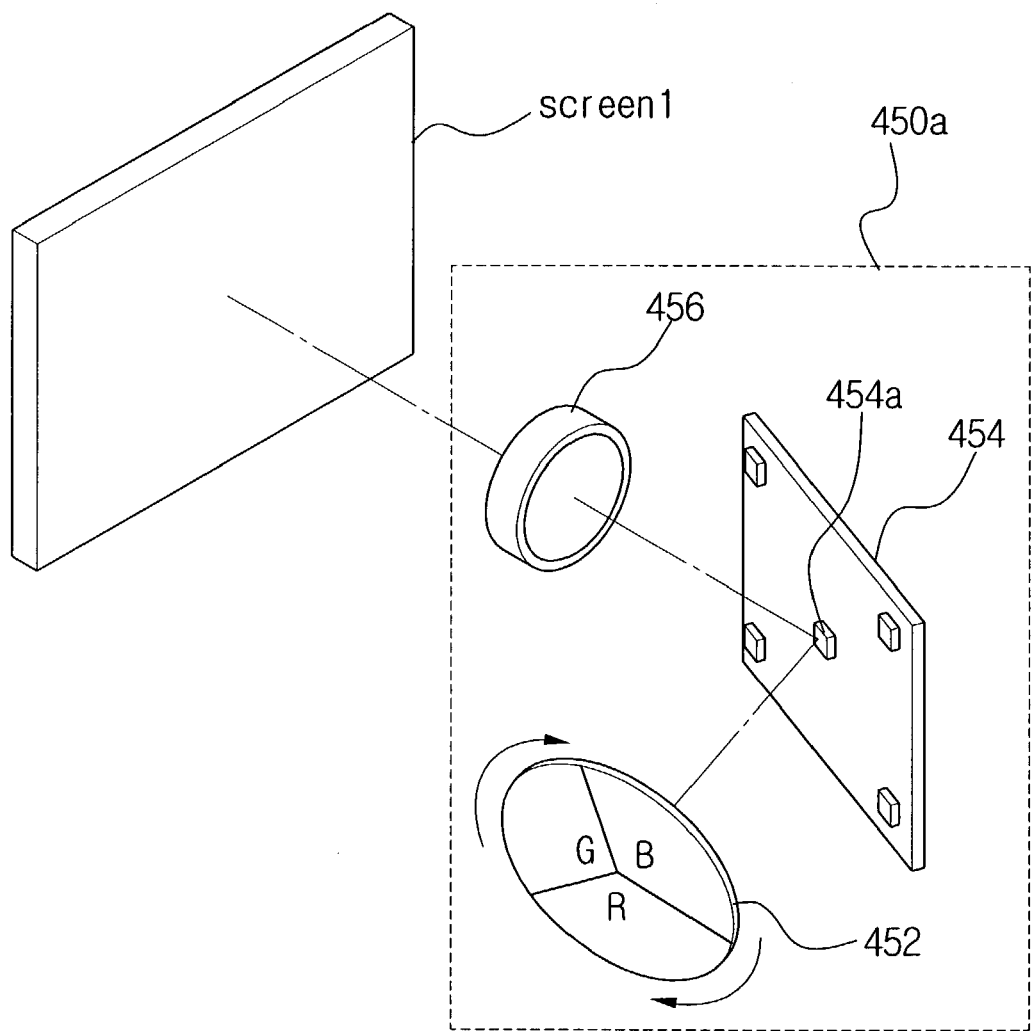
FIG. 5 shows a light scan part used for an image projection apparatus according to an exemplary embodiment of the present invention.

FIG. 5 shows the first light scan part 450a as used in an image projection apparatus according to an exemplary embodiment of the present invention.

The first light scan part 450a receives and projects onto a screen, i.e., screen1, the R, G, and B laser beams transmitted from the R, G, and B light couplers 420, 430, and 440 to implement an image thereon. The first light scan part 450a shown in FIG. 5 is a projector implementing an image, which employs a color wheel 452. The first light scan part 450a further includes a DMD panel 454 and a projection lens 456. In addition, the one-dot chain line shown in FIG. 5 denotes paths of white light.

The color wheel 452 is rotated by a rotation device in a direction as indicated by the arrows and is divided in R, G, and B regions. Furthermore, the color wheel 452 adaptively selects and transmits the R-laser beam inputted through the R-light coupler 420, the G-laser beam inputted through the G-light coupler 430, and the B-laser beam inputted through the B-light coupler 440.

The DMD panel 454 includes multiple micromirrors 454a. The R, G, and B laser beams, which are separated by wavelength, are reflected from the micromirror 454a provided on the DMD panel 454. Each of the reflected R, G, and B laser beams passes through the projection lens 456 to implement or project an image on the screen, i.e., screen1.

The projection lens 456 magnifies or minimizes an image reflected from the DMD panel 454. The projection lens 456 adjusts a size of an image implemented on a screen based on a total output amount of light inputted onto the first light scan part 450a. The total output amount of light is obtained by adding up the light amounts of the R, G, and B laser beams that are inputted to the first light scan part 450a from the R-light coupler 420, the G-light coupler 430, and the B-light coupler 440. The projection lens 456 can enlarge the size of an image implemented or projected on the screen, i.e., screen1, when the total output amount of light from the first light scan part 450a is high. The total output amount of light has a high value even when an image size is enlarged, so that a bright and clear image can be implemented or projected.

Each of the second and third light scan parts 450b and 450c has the same structure and function as the first light scan part 450a described with reference to FIG. 5, so that detailed descriptions of the light scan parts 405b and 450c will be omitted.

In addition to the color wheel 452, the light scan parts 450a, 450b, and 450c can employ diverse optical instruments, such as optical switches. Further, the light scan parts 450a, 450b, and 450c can be constructed in a three-panel fashion as well as in a single-panel (or one-panel) fashion.

When images are projected on two or more screens via the light scan parts 450a, 450b, and 450c, each of the light couplers 420, 430, and 440 has at least two optical fibers. That is, when images are projected on n screens, each of the light couplers 420, 430, and 440 has at least n optical fibers with n input terminals, n output terminals, and one connector.

Hereinafter, a picture ratio, that is, a magnitude of a diagonal line of an image, which can be implemented on each of the screens (screen1, screen2, and screen3), will be described for the case that three screens, i.e., screen1, screen2, and screen3, are provided, as shown in FIG. 4. The provided screens screen1, screen2, and screen3 have the same brightness.

If Pred is an output amount of an R-laser beam inputted to the first light scan part 450a having the screen screen1, if Pgreen is an output amount of a G-laser beam, and if Pblue is an output amount of a B-laser beam, then a total output amount of light emitted from an image implemented on the screen screen1 is PO=Pred+Pgreen+Pblue. Therein, if the total light output amount of the image implemented on the screen screen1 has a large value compared to images implemented on the screens screen2 and screen3, even though an image implemented on the screen screen1 is enlarged in size, the image can maintain brightness and clearness similar to the images implemented on the screens screen2 and screen3.

That is, if the same images are implemented or projected on multiple screens, and if the light output amounts for the respective images are different, the respective images can be implemented in different sizes by magnifying or minimizing them via the projection lens 456.

The size of an image, which can be implemented based on the light output amounts Pred, Pgreen, and Pblue outputted from the light couplers 420, 430, and 440 and inputted into the first light scan part 450$a$, is determined as follows.

$$Po = Io \times A = Io \times X \times Y \quad \text{[Formula 1]}$$

$$Y = \frac{Po}{Io \times X} \quad \text{[Formula 2]}$$

In Formula 1, Po denotes a total light output amount of an image implemented on the screen screen1, Io denotes a brightness per unit area of the image, A denotes an image area, X denotes an image length, and Y denotes an image width. Formula 2 is an equation obtained with respect to Y from Formula 1.

$$R^2 = X^2 + Y^2 \quad \text{[Formula 3]}$$

In Formula 3, R denotes the diagonal magnitude of an image, and the following result can be obtained by applying Formula 2 in Formula 3.

$$R \propto \sqrt{Po} \quad \text{[Formula 4]}$$

Formula 4 shows that R of an image is proportional to the square root of Po. This can be summarized in Table 1.

| Kinds of DC | Light output ratio | Image size ratio (light couplers with the same coupling ratio) | Number of screens possible |
|---|---|---|---|
| (1 × 1) DC | — | — | 1 |
| (2 × 2) DC | Pout_1:Pout_2 | √Pout_1:√Pout_2 | 2 |
| (3 × 3) DC | Pout_1:Pout_2:Pout_3 | √Pout_1:√Pout_2:√Pout_3 | 3 |
| (n × n) DC | Pout_1:Pout_2: . . . :Pout_n | √Pout_1:√Pout_2: . . . :√Pout_n | n |

The DC in the Table 1 denotes a light coupler, and (n×n) DC denotes a light coupler having n input terminals and n output terminals. The light output ratio is a ratio of light output amounts outputted to an optical instrument, such as a projector, from the output terminals of the light coupler. The image size ratio is a ratio determined in case that the output ratios of light beams, which are outputted into an optical instrument from the output terminals of a light coupler transmitting an R-laser beam, from the output terminals of a light coupler transmitting a G-laser beam, and from the output terminals of a light coupler transmitting a B-laser beam, are the same. If the output ratios of lights outputted into an optical instrument from the respective light couplers transmitting R, G, and B laser beams are not the same, the image size ratio varies. That is, the size of an image implemented on a screen can be controlled based on a light output ratio.

A light coupling device and image projection apparatus using the light coupling device according to the present invention employs (n×n)-structured light coupling devices having optical fibers to implement or project the same images on one or more screens at the same time. Further, the present invention controls output amounts of lights outputted from the light coupling devices so as to enable magnifying or minimizing the sizes of images to be implemented on multiple screens. Therefore, the present invention can display the images in different sizes on the multiple screens.

Therein, changes in the brightness and clearness of the images are insubstantial or non-existent when the image sizes vary.

Further, the light coupling devices can be used in a bi-directional way. By replacing the light coupling devices, images vary in size, while the brightness of the images is maintained. Accordingly, with the image projection apparatus according to the present invention, multiple images can be implemented or projected with one light source. Such an image projection apparatus can be employed in a theater or in an exhibition room, or the like.

Although exemplary embodiments of the present invention have been described above, it will be understood by those skilled in the art that the present invention should not be limited to the exemplary embodiments described herein. Rather, various changes and modifications can be made without deviating from the spirit and scope of the present invention as defined by the appended claims.

What is claimed is:

1. An image projection apparatus, comprising:
    a light source for emitting multiple monochromatic light beams having different wavelengths;
    a plurality of light coupling devices, each light coupling device having at least two input terminals and at least two output terminals for receiving and dividing the monochromatic light beams in a predetermined ratio; and
    a plurality of light scan parts for receiving the respective divided monochromatic light beams and for projecting the respective divided monochromatic light beams on screens.

2. The image projection apparatus as claimed in claim 1, wherein the light coupling devices each comprise:
    a photoconductive medium, including:
        at least two input terminals;
        at least two output terminals; and
        a connector for connecting the input and output terminals; and
    first lenses provided at the input terminals of the photoconductive medium for condensing the monochromatic light beams,
    wherein the connector forms at least one light path.

3. The image projection apparatus as claimed in claim 2, wherein the connector is formed by heating a position that is located at a distance from the input terminals.

4. The image projection apparatus as claimed in claim 2, wherein the connector is heated with a predetermined light coupling ratio; and
    wherein the light coupling ratio is controlled based on
    1) an extent of proximity of the at least two input terminals at an end surface of the connector and
    2) a length of the connector in a lengthwise direction.

5. The image projection apparatus as claimed in claim 2, wherein the photoconductive medium comprises optical fibers.

6. The image projection apparatus as claimed in claim 5, wherein the connector is arranged at at least one of
   1) a first position at which cores of at least two of the optical fibers are located within a predetermined distance in lengthwise directions of the cores, and
   2) a second position at which the cores of the optical fibers are in contact in the lengthwise directions of the cores.

7. The image projection apparatus as claimed in claim 2, further comprising second lenses provided at the output terminals of the photoconductive medium for condensing and outputting the inputted light beams transmitted through the connector.

* * * * *